Oct. 2, 1945.   L. A. KEMPTON   2,386,051
VOLUME CONTROL DEVICE
Filed April 7, 1943

Inventor:
Leslie A. Kempton,
by Harry E. Dunham
His Attorney.

Patented Oct. 2, 1945

2,386,051

UNITED STATES PATENT OFFICE 2,386,051

VOLUME CONTROL DEVICE

Leslie A. Kempton, Chicago, Ill., assignor to Edison General Electric Appliance Co., Inc., Chicago, Ill., a corporation of New York Application April 7, 1943, Serial No. 482,183

2 Claims. (Cl. 50—14)

This invention relates to volume control devices, more particularly to such devices for controlling the flow of a fluid, such as water, so that a predetermined quantity is passed within a given unit of time, irrespective of fluctuations in the fluid pressure on the supply side of the device, and it has for its object the provision of a device of this character which is simple and inexpensive in construction and reliable and efficient in its operation.

In accordance with this invention in one form thereof, the device comprises a housing having an intake for the fluid to be measured and an outlet for discharging the fluid. A piston is arranged in the housing having one side exposed to the pressure of the fluid entering the inlet, together with means for loading the other side of the piston to resist its movement in the housing by the pressure of the fluid entering the housing. Therefore, the piston will assume various positions within the housing dependent upon the pressure of the fluid entering the housing. The piston is constructed and arranged to control the effective area of the outlet opening in response to its movement so that the quantities of fluid passed through the device within a given unit of time are substantially the same, irrespective of the variations in the pressure on the inlet side, within a predetermined pressure range.

Figure 1:
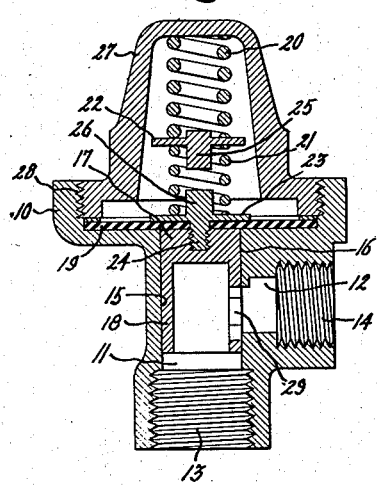
Figure 2:
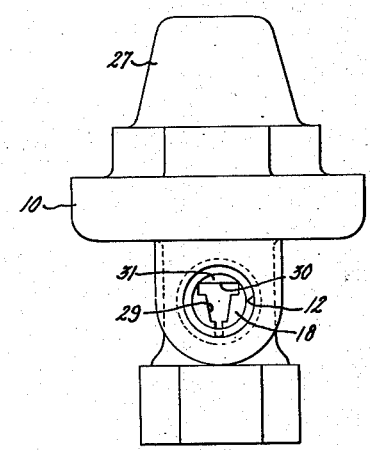
Figure 3:
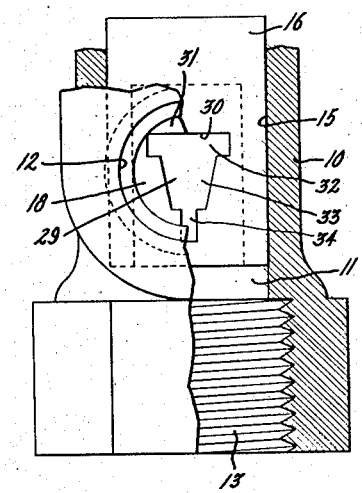

For a more complete understanding of this invention, reference should be had to the accompanying drawing in which Fig. 1 is a vertical sectional view taken through a volume control device embodying this invention; Fig. 2 is a side elevation of the device looking at it from the right-hand side of Fig. 1; and Fig. 3 is a fragmentary sectional view taken through a portion of the device shown in Figs. 1 and 2.

Referring to the drawing, this invention has been shown as applied to a liquid volume control device for measuring a fixed quantity of water to be fed to a dishwashing machine, which has not been illustrated. The device comprises a housing or casing 10 having at its lower end, as viewed in Fig. 1, an inlet opening 11. In a side wall at right angles to the opening 11 there is a discharge opening 12. The housing is threaded as indicated at 13 and 14 so that suitable inlet and outlet pipe connections may be made with the housing at the inlet and outlet openings 11 and 12.

The housing further is provided with a longitudinal cylindrical chamber 15 in which reciprocates a cylindrical piston 16. The piston comprises a head 17 at its upper end and a cylindrical section 18 depending from the head so that the bottom surface of the piston head is exposed to the inlet opening 11. Therefore, the pressure of the liquid on the supply side of the device operates upon the head and tends to force the piston upwardly within a chamber 15.

The chamber 15 is closed at the top by means of a gasket 19 which may be formed of any suitable material, such as rubber. And above this gasket are mounted relatively strong and light springs 20 and 21 which resist the upward movement of the piston by the fluid entering the device. The spring 21 in interposed between plate-like spring seats 22 and 23, the former being located at the top of the spring and the latter being secured to the piston 17 in any suitable way as by means of a depending stud 24 threaded into the piston. The two seats are provided with projecting spring guides 25 and 26, as shown. The second spring 20 is located above the seat 22, having one end bearing against this seat, and having its other end bearing against a cap 27 which encloses the two spring members. This cap 27 has a threaded connection 28 with the body member 10.

It will be understood that inasmuch as the spring 21 is relatively weaker than the spring 20, when the inlet pressures are low, the weak spring 21 initially controls the movement of the piston upwardly as the fluid pressure increases. As the fluid pressure rises and the piston moves further in its upward direction the stronger spring 20 begins to take effect and at a predetermined high pressure, the resistance to the movement of the piston rapidly increases. However, for any particular pressure the piston will assume a definite position within the housing 10.

The cylindrical section 18 of the piston is provided with a lateral port 29 which registers with the opening 12. The opening 12 and the port 29 have such shapes that for any given pressure at the intake side of the device the piston will be moved to such a position that the same quantity of fluid will flow through the opening 12 per unit of time. In other words, the same quantity of fluid will be passed through the device in any given period of time, irrespective of the pressure at the inlet side, within a predetermined pressure range. In the particular device illustrated the outlet opening 12 is in the main circular but at the top it is closed by a straight edge 30 which is formed on a secant-shaped section 31 at the top of the opening. The port 29, as shown, is defined by a substantially rectangular-shaped section 32 at the top, the bottom of this section terminating in a section 33 having sides tapering inwardly towards each other toward the bottom of the section 18 and which in turn at the bottom terminates in a vertically positioned rectangular section 34.

The parts are shown in Figs. 2 and 3 at the lowest inlet pressure. It will be observed that as the pressure of the fluid increases and the piston moves upwardly that first of all the rectangular section 32 will be greatly decreased as this section rides up over the edge 30. When the bottom of this section is cut off by the edge 30 the effective area of port 29 rather abruptly decreases and it gradually decreases until the bottom edge of the section 33 is cut off by the edge 30 when only the opening 34 is available to pass the liquid. This happens when the inlet pressure is very high.

While the particular shapes of the opening 12 and the port 29 may be calculated mathematically, the particular shapes shown in the particular embodiment of the invention illustrated were determined empirically.

The particular shapes are such that there is a much larger effective discharge area at the opening 12 for low pressures than for high pressures, as has been explained. It is for this reason that it is necessary to have a considerably greater movement per unit of pressure change at the lower inlet pressures than per unit of pressure change at the higher inlet pressures. And it is for this reason also that the light spring 21 has been provided to resist movement of the piston when operating within the low pressure range and the relatively strong spring 20 has been provided to resist movement of the piston when operating within the high pressure range.

It is possible to use but a single resisting spring instead of two springs 20 and 21, but where a single spring is used a much longer spring must be used which greatly increases the bulkiness and size of the device, and in addition it is difficult to form a single spring which will give the varying resistance that is desired.

The use of the two springs providing for the varying movement of the piston per unit of pressure change within the low and high pressure ranges has made it possible to use the relatively simple shape of discharge port 29 in the piston.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A liquid volume control device comprising a housing having inlet and outlet openings for the passage of the liquid through the device, a piston within said housing having a hollow interior and a port in the side wall thereof registering with said outlet opening, and the piston positioned with reference to said inlet opening so that the liquid flows into the piston and out through its port and said outlet opening, the pressure of said liquid biasing said piston in one direction, said outlet opening having a straight edge at its side that is remote from said inlet opening and said port generally increasing in area as it approaches said edge, a relatively light spring resisting the movement of said piston in said one direction by the pressure of said liquid, a relatively heavy spring functioning as an abutment for said light spring and further resisting movement of said piston in said one direction, said light spring permitting greater movement per unit pressure change at the lower pressures when the flow is through the large effective discharge area afforded by said port, and said heavier spring resisting movement of said piston when said effective discharge area is reduced at the higher pressures, all so that the quantity of liquid permitted to flow through said device per unit of time is substantially constant, irrespective of the magnitude of the liquid pressure within a predetermined pressure range.

2. A liquid volume control device comprising a housing having inlet and outlet openings for the passage of the liquid through the device, a piston within said housing having a hollow interior and a port in the side wall thereof registering with said outlet opening, and the piston positioned with reference to said inlet opening so that the liquid flows into the piston and out through its port and said outlet opening, the pressure of said liquid biasing said piston in one direction, said outlet opening having a straight edge at said side that is remote from said inlet opening and said port having a substantially rectangular shaped section located at the end of said port that is remote from said inlet opening and extending crosswise thereof, said rectangular section merging into a second tapered section having sides tapering inwardly from each other as they approach said inlet opening, a relatively light spring resisting the movement of said piston in said one direction by the pressure of said liquid, a relatively heavy spring functioning as an abutment for said relatively light spring and further resisting movement of said piston in said one direction, said light spring permitting greater movement per unit pressure change at the lower pressures when the flow is through the large effective discharge area afforded by said rectangular and tapered sections, and said heavier spring resisting movement of said piston when said effective discharge area is reduced at the higher pressures, all so that the quantity of liquid permitted to flow through said device per unit of time is substantially constant, irrespective of the magnitude of said liquid pressure within a predetermined pressure range.

LESLIE A. KEMPTON.